(12) United States Patent
Lee et al.

(10) Patent No.: US 7,349,429 B2
(45) Date of Patent: Mar. 25, 2008

(54) METHOD AND APPARATUS FOR DETECTING FORMAT OF CLOSED CAPTION DATA AUTOMATICALLY AND DISPLAYING THE CAPTION DATA

(75) Inventors: Joo-yoen Lee, Yongin-si (KR); Jung-a Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 766 days.

(21) Appl. No.: 10/776,639

(22) Filed: Feb. 12, 2004

(65) Prior Publication Data

US 2006/0098641 A1  May 11, 2006

(30) Foreign Application Priority Data

Mar. 5, 2003  (KR)  ............. 10-2003-0013612

(51) Int. Cl.
*H04J 3/16* (2006.01)
(52) U.S. Cl. ............ 370/466; 370/389; 370/392; 348/441

(58) Field of Classification Search ............... None
See application file for complete search history.

(56) References Cited

U.S. PATENT DOCUMENTS

| | | | |
|---|---|---|---|
| 6,373,526 B1 | 4/2002 | Kessler et al. | |
| 6,784,943 B1* | 8/2004 | Tults | 348/465 |
| 7,050,109 B2* | 5/2006 | Safadi et al. | 348/468 |
| 2002/0067428 A1* | 6/2002 | Thomsen | 348/465 |

* cited by examiner

*Primary Examiner*—Duc Ho
(74) *Attorney, Agent, or Firm*—Sughrue Mion, PLLC

(57) ABSTRACT

A method and apparatus for detecting a format of closed caption data contained in a broadcast signal automatically and displaying the caption data are provided. The method includes: (a) receiving information including closed caption data extracted from the broadcast signal, (b) detecting information on the format of the closed caption data from the received information including the closed caption data and determining the format of the closed caption data, and (c) decoding the closed caption data according to the determined format of the closed caption data and displaying the caption data to a user.

16 Claims, 3 Drawing Sheets

METHOD AND APPARATUS FOR DETECTING FORMAT OF CLOSED CAPTION DATA AUTOMATICALLY AND DISPLAYING THE CAPTION DATA

BACKGROUND OF THE INVENTION

This application claims the priority of Korean Patent Application No. 2003-13612, filed on Mar. 5, 2003, in the Korean Intellectual Property Office, the disclosure of which is incorporated herein in its entirety by reference.

1. Field of the Invention

The present invention relates to digital broadcasting, and more particularly, to a method and apparatus for detecting a format of closed caption data automatically and displaying the caption data.

2. Description of the Related Art

An Advanced Television Systems Committee (ATSC) standard has been used as a digital terrestrial broadcast standard in the U.S.A. Also, the ATSC standard has been used as a standard digital terrestrial broadcasting system in the Republic of Korea.

Closed caption data is information on character data contained in a broadcast signal or a video signal and also includes information on a format of displaying the character data on a screen displayed to a user. There is a difference between a method for providing a subtitle by inputting the subtitle on a broadcast screen and setting the subtitle as a part of a screen data, which is one method for providing a subtitle to a broadcast screen, and a method for providing closed caption data, in that in the latter case, closed caption data is extracted from a broadcast video signal, synchronized with contents of a screen displayed to a user, and displayed to the user. If the user does not want to see the closed caption data or a broadcasting display device (e.g., television (TV)) does not support the closed caption data, the subtitle may not be displayed on the screen.

There are two standards for including closed caption data or closed caption information in a broadcast signal, such as Electronic Industries Association-608 (EIA-608) and Electronic Industries Association-708 (EIA-708). An ATSC standard supports both EIA-608 and EIA-708 standards.

A conventional digital TV for supporting both EIA-608 and EIA-708 standards basically supports closed caption data according to the EIA-708 standard. It is considered that all closed caption data contained in an input broadcast signal is coded according to the EIA-708 standard, and the closed caption data is decoded, and caption data is displayed to a user. The user changes a method for decoding closed caption data into the EIA-608 standard using a remote controller such that the closed caption data is decoded according to the EIA-608 standard and caption data is displayed to the user.

In other words, in the conventional digital TV, in general, when the closed caption data is decoded according to the EIA-708 standard and displayed to the user and closed caption data defined by the EIA-608 standard is contained in the broadcast signal and received, the caption data displayed to the user is not normal. The user should change a method for decoding closed caption data for a digital TV into the EIA-608 standard such that a TV decodes the closed caption data according to the EIA-608 standard and displays caption data to the user. If a broadcast signal including closed caption data defined by the EIA-708 standard is received, the user should change the method for decoding the closed caption data into the EIA-708 standard again.

Thus, if closed caption data defined by the EIA-708 and EIA-608 standards are together or alternately contained in a broadcast signal input into a digital TV (for example, closed caption data defined by the EIA-708 standard is contained in over-the-air broadcasting, but closed caption data defined by the EIA-608 standard which is a conventional standard, may be contained in cable broadcasting.), the user should change a method for processing closed caption data manually whenever closed caption data defined by a different standard is received. In this regard, the user can identify that contents of caption data displayed on a screen are abnormal.

In the prior art, the user knows that closed caption data is contained in a broadcast signal, according to information, such as caption descriptor, contained in program specific information (PSI)/program and system information protocol (PSIP). However, when the broadcast signal including the closed caption data is received, but information, such as caption script, which is simultaneously transmitted with the broadcast signal and has a different transmission bandwidth, is not received due to other causes, the caption data cannot be displayed on the screen.

SUMMARY OF THE INVENTION

The present invention provides a method and apparatus for detecting a format of closed caption data automatically and displaying the caption data by which a broadcast signal including closed caption data defined by a different standard, such as EIA-708 or EIA-608, is received. The standard of the closed caption data is automatically detected, caption data defined by the detected standard is provided, and the caption data is received even when information, such as caption descriptor, representing that caption data is contained in a broadcast signal, is not correctly received.

The present invention also provides a computer readable medium on which a program for executing the method for detecting a format of closed caption data automatically and displaying the caption data in a computer is recorded.

According to an aspect of the present invention, a method for detecting a format of closed caption data contained in a broadcast signal automatically and displaying the caption data includes: (a) receiving information including closed caption data extracted from the broadcast signal; (b) detecting information on the format of the closed caption data from the received information including the closed caption data and determining the format of the closed caption data; and (c) decoding the closed caption data according to the determined format of the closed caption data and displaying the caption data to a user.

According to another aspect of the present invention, an apparatus for detecting a format of closed caption data contained in a broadcast signal automatically and displaying the caption data includes a receiving unit, which receives information including closed caption data extracted from the broadcast signal; a header extraction unit, which extracts a header portion of the closed caption data from the information including the closed caption data received by the receiving unit; a caption format detection unit, which detects information on a format of the closed caption data from the header portion extracted from the header extraction unit; a caption formation determination unit, which determines the format of the received closed caption data from the information detected by the caption format detection unit; and a caption decoder, which decodes the closed caption data according to the format of the closed caption data determined by the caption format determination unit and displays the caption data to a user.

According to another aspect of the present invention, a computer readable recording medium on which a program for executing the method for detecting a format of closed caption data automatically and displaying the caption data in a computer is recorded. The method includes (a) receiving information including closed caption data extracted from the broadcast signal; (b) extracting a header portion of the closed caption data from the received information including the closed caption data; (c) detecting information on the format of the closed caption data from the extracted header portion and determining the format of the closed caption data; and (d) decoding the closed caption data according to the determined format of the closed caption data and displaying the caption data to a user.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the accompanying drawings.

Figure 1:
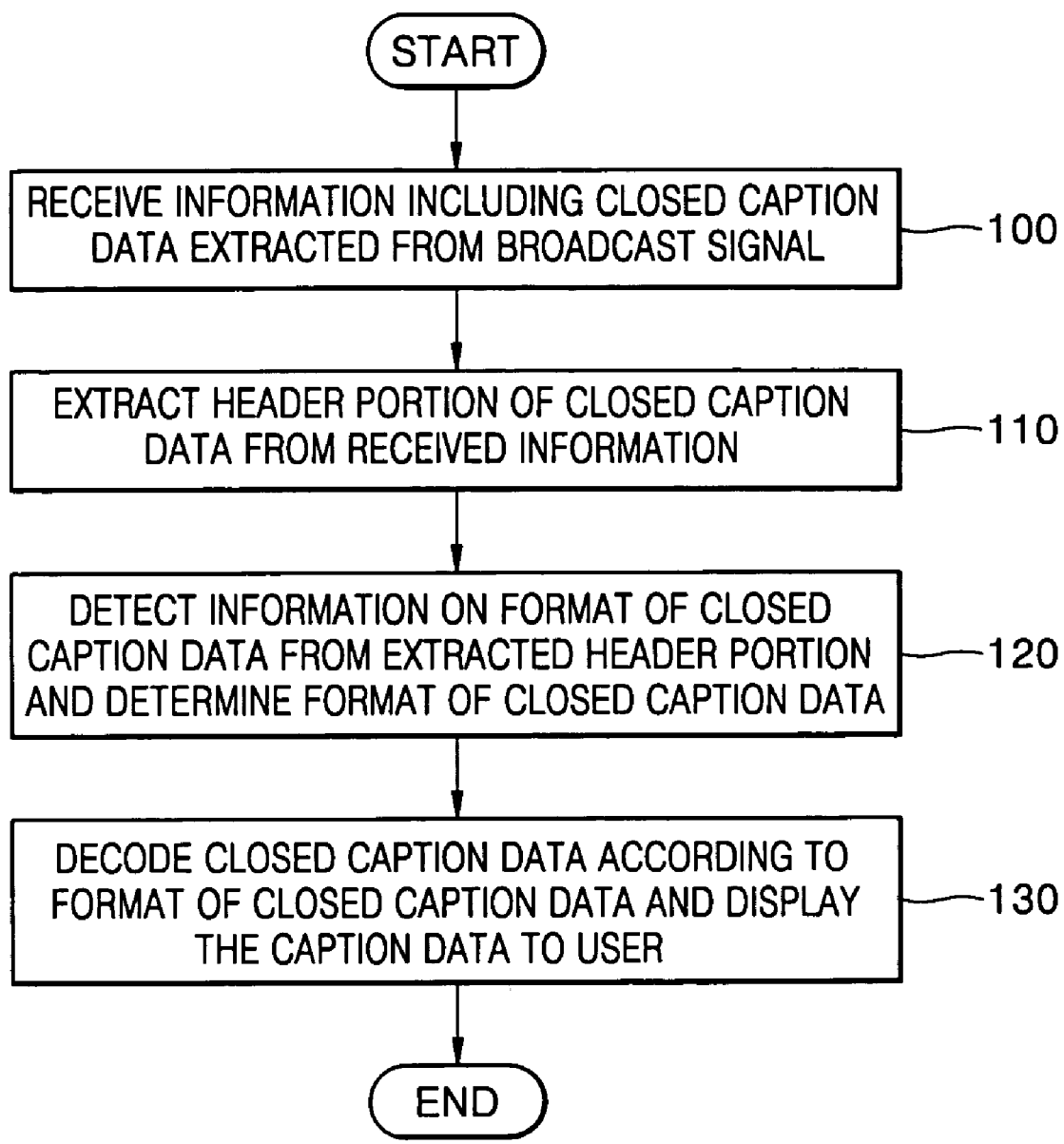
FIG. 1 is a flowchart illustrating a method for detecting a format of closed caption data automatically and displaying the caption data according to the present invention.

FIG. 1 is a flowchart illustrating a method for detecting a format of closed caption data automatically and displaying the caption data according to the present invention.

Transmission of a digital broadcast signal including a stream data decoded in an MPEG format is received, and information including closed caption data is extracted from the digital broadcast signal, and video data and the closed caption data are separated from each other. This operation may be performed using a well-known technology for processing a digital broadcast signal, and the separation operation will not be separately described in the present invention.

In step 100, information including closed caption data extracted from the broadcast signal is received. In step 110, a header portion of the closed caption data is extracted from the received information including the closed caption data. In step 120, information on the format of the closed caption data is detected from the extracted header portion, and the format of the closed caption data is determined. In step 130, the received closed caption data is decoded according to the format of the determined closed caption data and displayed to a user, and the caption data decoded according to a data format is automatically displayed to the user.

Figure 2:
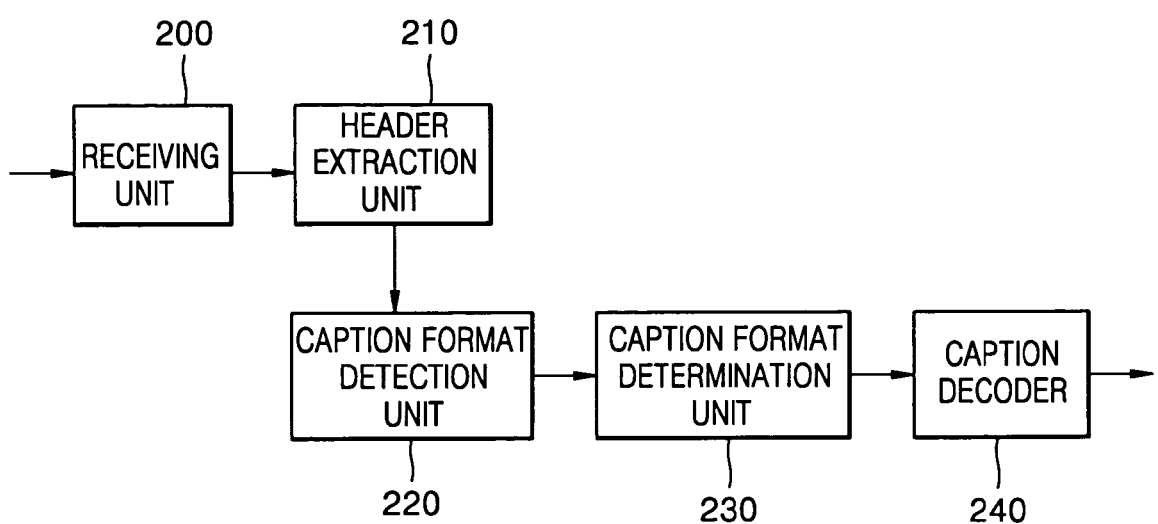
FIG. 2 is a block diagram illustrating a structure of an apparatus for detecting a format of closed caption data automatically and displaying the caption data according to the present invention.

FIG. 2 is a block diagram illustrating a structure of an apparatus for detecting a format of closed caption data automatically and displaying the caption data according to the present invention. A receiving unit 200 receives closed caption data extracted from a broadcast signal, and a header extraction unit 210 extracts a header portion of the closed caption data from the closed caption data received by the receiving unit 200. A caption format detection unit 220 detects information on the format of the closed caption data from the extracted header portion, and a caption format determination unit 230 determines the format of the received closed caption data from the detected information on the format of the closed caption data. A caption decoder 240 decodes the received closed caption data according to the format of the closed caption data and displays it to users.

Figure 3:
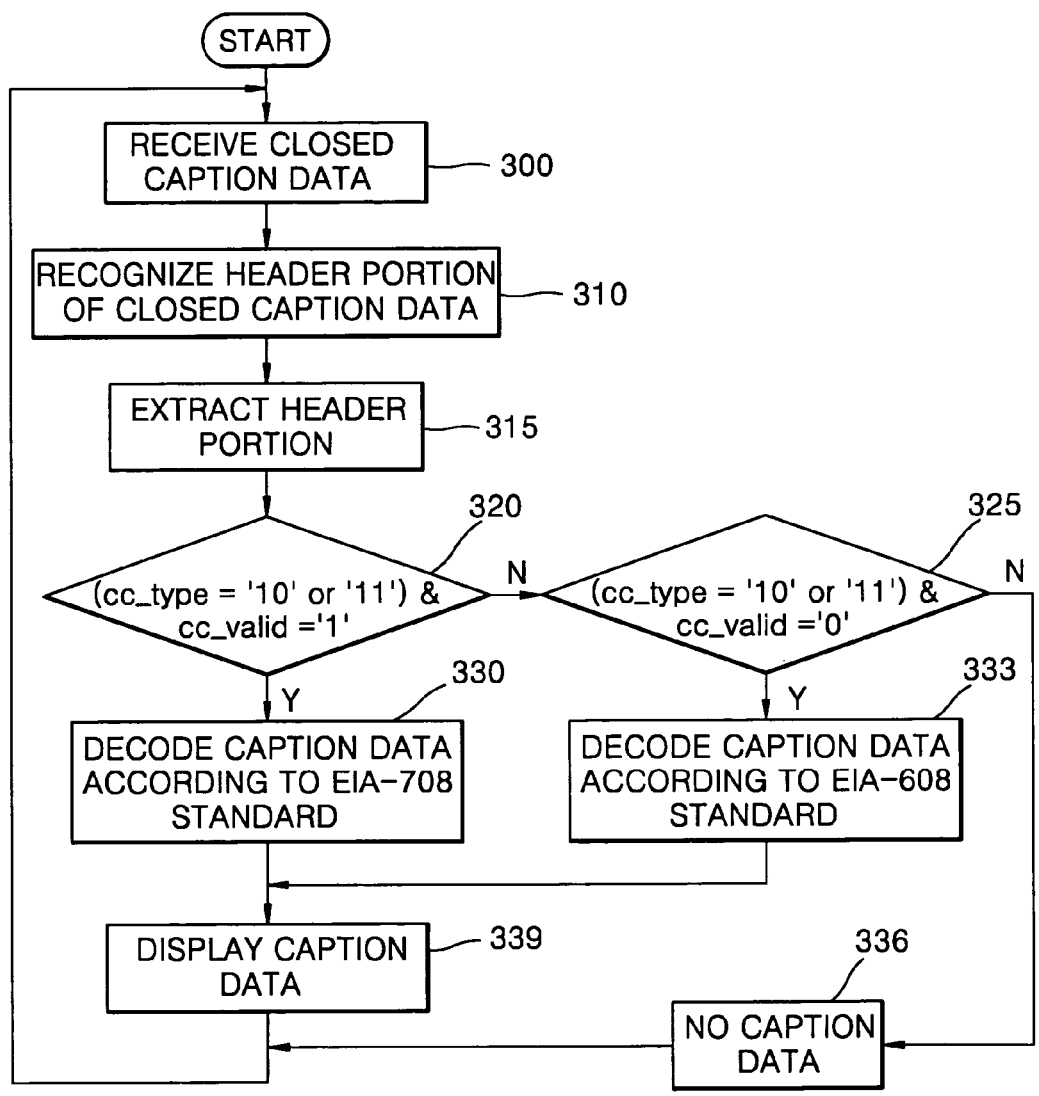
FIG. 3 is a flowchart illustrating a method for detecting a format of closed caption data automatically and displaying the caption data and specifically illustrating the method shown in FIG. 1, according to an embodiment of the present invention.

Hereinafter, an operation according to the present invention will be described in detail using the method of FIG. 1 and the structure of FIG. 2. FIG. 3 is a flowchart illustrating a method for detecting a format of closed caption data automatically and displaying the caption data and specifically illustrating the method shown in FIG. 1, according to an embodiment of the present invention. Hereinafter, the operation of the apparatus of FIG. 2 using the method of FIG. 3 will be described.

In step 300, the receiving unit 200 receives information including closed caption data separated from a digital broadcast signal and transmits the received information to the header extraction unit 210. Caption data having a coded format is contained in the separated closed caption data. In step 310, the header extraction unit 210 recognizes the header portion of the closed caption data. In step 315, the header extraction unit 210 extracts the header portion of the closed caption data from the information including the closed caption data. In steps 320 and 325, the type of caption data is determined.

In this case, preferably, the header portion of the closed caption data is extracted by the header extraction unit 210 by sensing a predetermined pattern value corresponding to a header and sensing a starting part of the header portion. The predetermined pattern value by which starting of the header portion can be known, is defined by an ATSC standard which is a standard for a digital broadcasting signal, and is also defined by an EIA-608 or EIA-708 standard for closed caption data.

When the standard for the digital broadcast signal is changed or extended and the pattern value of the starting part of the header portion of the closed caption data is varied, the pattern value of the starting part of the header portion detected to extract the header portion may be varied. Otherwise, even when the definition of the closed caption data is varied and information on the format of the closed caption data is contained in portions other than the header portion, if the information is contained in the closed caption data, by detecting a portion in which the information is contained, it can be known that the caption data displayed on the screen starts.

Information on the size of a header contained in the closed caption data received by the receiving unit 200 and the format of the closed caption data, information, such as a control data for displaying closed caption data on a screen such as a TV, and information on caption data displayed on an actual screen from the received closed caption data can be known from information contained in the header portion of the closed caption data. In particular, the caption format detection unit 220 detects values of specific fields cc_type and cc_valid from the header portion. The fields cc_type and cc_valid are fields defined in the above standard in advance.

The caption format determination unit 230 determines the format of the closed caption data according to the combination of values of the fields cc_type and cc_valid. Currently, standards on the format of the closed caption data include an EIA-608 standard or an EIA-708 standard. Preferably, the format of the closed caption data for supporting the standards includes one of a format defined by an EIA-608 closed caption standard and a format defined by an EIA-708 closed caption standard.

When the value of the field cc_type is the same as a binary numeral '10' or '11' and the value of the field cc_valid is the same as a binary numeral '1', in step 320, the caption format determination unit 230 determines that the format of the received closed caption data is defined by the EIA-708 standard. In step 330, the caption decoder 240 decodes the caption data according to the EIA-708 standard, and in step 339, the caption data is displayed on a user's screen.

When the value of the field cc_type is the same as a binary numeral '10' or '11' and the value of the field cc_valid is the same as a binary numeral '0', in step 325, the caption format determination unit 230 determines that the format of the received closed caption data is defined by the EIA-608 standard. In step 330, the caption decoder 240 decodes the caption data according to the EIA-608 standard, and in step 339, the caption data is displayed on the user's screen.

If not the above case, that is, when the value of the field cc_type is a binary numeral '00' or '01', in step 336, the caption format determination unit 230 determines that the closed caption data is not contained in the received information including the closed caption data regardless of the value of the field cc_valid. This case corresponds to a case where there are errors in receiving the information including the closed caption data in step 100 or 300.

Displaying the caption data on the screen in step 339 is performed while the caption data is synchronized with video and sound according to a display format contained in the closed caption data. This operation is similar in a conventional method and could have been easily carried out by skilled persons in the art to which the present invention belongs.

During a broadcasting of a broadcast signal including caption data defined by the EIA-608 standard, a broadcast signal including caption data defined by the EIA-708 standard may be transmitted. On the other hand, during a broadcasting of a broadcast signal including caption data defined by the EIA-708 standard, a broadcast signal including caption data defined by the EIA-608 standard may be transmitted. Using the method and apparatus according to the present invention, a correct caption data can be automatically displayed to a user in either of the above cases.

In preparation for the above former case, when closed caption data contained in a broadcast signal, received while the caption decoder 240 decodes the closed caption data received according to the format of the EIA-608 closed caption standard according to the format determined by the caption format determination unit 230 and displays the closed caption data to a user, is determined by the caption format determination unit 230 as closed caption data having a format according to the EIA-708 closed caption standard, preferably, the caption decoder 240 decodes the closed caption data according to the EIA-708 closed caption standard automatically and displays the closed caption data to the user.

In preparation for the above latter case, when closed caption data contained in a broadcast signal, received while the caption decoder 240 decodes the closed caption data received according to the format of the EIA-708 closed caption standard according to the format determined by the caption format determination unit 230 and displays the closed caption data to a user, is determined by the caption format determination unit 230 as closed caption data having a format according to the EIA-608 closed caption standard, preferably, the caption decoder 240 decodes the closed caption data according to the EIA-608 closed caption standard automatically and displays the closed caption data to the user.

Through the above operations, only by activating a caption function in a device, such as a TV, the user can see that the caption data is displayed on the screen regardless of transmission of caption data defined by the EIA-608 or EIA-708 standard. For example, when caption data defined by the EIA-708 standard is contained in a broadcast signal and transmitted, caption data is displayed on a user's screen and caption data defined by the EIA-608 standard is contained in other broadcasting programs and transmitted (or even in a reverse case), in the prior art, in each case, a user should perform a function of processing the caption data according to the EIA-708 or EIA-608 standard manually. However, a user using a TV having the function according to the present invention automatically senses that the standard of the caption data is changed, and the caption data decoded according to the changed standard of the caption data is displayed on the screen. Thus, the user need not pay attention to the standard of the caption data.

The above description relates to a TV. However, a function of automatically detecting the format of closed caption data and displaying caption data according to the present invention can be applied to a personal computer (PC). Video of a digital TV and caption data could be seen through a monitor screen of a computer including a TV card having the function according to the present invention. Otherwise, the TV card may process information on video and sound from a digital broadcast signal, process the closed caption data by a software method according to the present invention and display the closed caption data on a monitor screen of the computer. In this way, the present invention may be embodied in various forms.

In the prior art, the fact that the closed caption data is contained in a broadcast signal can be known using a descriptor for providing information on caption. However, according to the present invention, information on caption can be known using only the closed caption data. Thus, even if the caption descriptor is transmitted to a bandwidth different from a bandwidth of a broadcast signal, the caption data contained in the broadcast signal can be processed. Thus, even though a bandwidth narrower than that of the prior art is used for the broadcast signal, the caption data can be processed, such that the flexibility of processing the caption data is improved.

In addition, performing each of the steps according to the present invention in various forms, such as a software method or a hardware method, using a general programming method can be known by skilled persons in the art of the present invention. For example, each step or element of the present invention may be embodied using a programmable device, such as PILD or FPGA.

Some or all of the steps of the present invention can also be embodied as a computer readable code on a computer readable recording media. The computer readable recording media include all types of recording devices in which data that can be read by a computer system are stored, such as ROMs, RAMs, CD-ROMs, magnetic tapes, floppy discs, optical data storage units, and carrier waves (for example, transmission via the Internet). Also, the computer readable recording media are distributed over a network-connected computer system and can be stored and executed by computer readable codes.

According to the present invention, in a method for displaying closed caption data contained in a broadcast signal to a user, information including the closed caption data extracted from the broadcast signal is received, information on the format of the closed caption data is detected from the information including the received closed caption data, the format of the closed caption data is determined, and the closed caption data is decoded according to the determined format of the closed caption data and displayed to the user, such that the format in which the closed caption data is coded is automatically sensed and caption data is accordingly displayed to the user.

In the case of using the method and apparatus according to the present invention, only by selecting activation of a caption function, a user can see caption data correctly displayed on a screen regardless of the standard of closed caption data contained in a broadcast signal. Accordingly, a digital broadcasting signal including the closed caption data is processed such that services can be provided regardless of the standard of coding the caption data when providing subtitle, two-way TV services, and conversation-type services which are fields of displaying caption data to the user and the user to whom broadcasting services including the caption data are provided can receive a correct caption data without fail. As a result, both providing and using broadcasting services including the closed caption data can be performed more conveniently, and the field of using digital broadcasting of providing the closed caption data is increased.

While this invention has been particularly shown and described with reference to a preferred embodiment thereof, it will be understood by those skilled in the art that various changes in form and details may be made therein without departing from the spirit and scope of the invention as defined by the appended claims and equivalents thereof.

What is claimed is:

1. A method for detecting a format of closed caption data contained in a broadcast signal automatically and displaying the closed caption data, the method comprising:
    (a) receiving information including the closed caption data extracted from the broadcast signal;
    (b) detecting information on the format of the closed caption data from the received information including the closed caption data and determining the format of the closed caption data; and
    (c) decoding the closed caption data according to the determined format of the closed caption data and displaying the closed caption data to a user,
    wherein the format of the closed caption data in (b) or (c) includes one of a format defined by an EIA-608 closed caption standard or a format defined by an EIA-708 closed caption standard, and wherein when the format of the closed caption data detected in (b) is determined as the format defined by the EIA-608 closed caption standard and closed caption data having the format defined by the EIA-708 closed caption standard is received while the closed caption data received in (a) according to the EIA-608 closed caption standard in (c) is displayed to the user, the closed caption data is automatically decoded according to the EIA-708 closed caption standard and displayed to the user.

2. The method of claim 1, wherein (b) comprises:
    (b1) extracting a header portion of the closed caption data from the received information including the closed caption data; and
    (b2) detecting the information on the format of the closed caption data from the extracted header portion and determining the format of the closed caption data.

3. The method of claim 2, wherein the format of the closed caption data in (b2) includes one of a format defined by an EIA-608 closed caption standard and a format defined by an EIA-708 closed caption standard.

4. The method of claim 3, wherein when the format of the closed caption data detected in (b) is determined as the format defined by the EIA-608 closed caption standard and closed caption data having the format defined by the EIA-708 closed caption standard is received while the closed caption data received in (a) according to the EIA-608 closed caption standard in (c) is displayed to the user, the closed caption data is automatically decoded according to the EIA-708 closed caption standard and displayed to the user.

5. The method of claim 3, wherein when the format of the closed caption data detected in (b) is determined as the format defined by the EIA-708 closed caption standard and closed caption data having the format defined by the EIA-608 closed caption standard is received while the closed caption data received in (a) according to the EIA-708 closed caption standard in (c) is displayed to the user, the closed caption data is automatically decoded according to the EIA-608 closed caption standard and displayed to the user.

6. The method of claim 2, wherein (b1) comprises sensing a predetermined pattern value corresponding to the header portion and sensing a starting part of the header portion.

7. An apparatus for detecting a format of closed caption data contained in a broadcast signal automatically and displaying the closed caption data, the apparatus comprising:
    a receiving unit, which receives information including the closed caption data extracted from the broadcast signal;
    a header extraction unit, which extracts a header portion of the closed caption data from the information including the closed caption data received by the receiving unit;
    a caption format detection unit, which detects information on the format of the closed caption data from the header portion extracted from the header extraction unit;
    a caption formation determination unit, which determines the format of the recived closed caption data from the information detected by the caption format detection unit; and
    a caption decoder, which decodes the closed caption data according to the format of the closed caption data determined by the caption format determination unit and displays the closed caption data to a user,
    wherein the format of the closed caption data includes one of a format defined by an EIA-608 closed caption standard and a format defined by an EIA-708 closed caption standard, and wherein when the closed caption data contained in the broadcast signal, received while the caption decoder decodes the closed caption data received according to the format of the EIA-608 closed caption standard, according to the format determined by the caption format determination unit and displays the closed caption data to the user, is determined by the caption format determination unit as closed caption data having the format defined by the EIA-708 closed caption standard, the caption decoder decodes the closed caption data according to the EIA-708 closed caption standard automatically and displays the closed caption data to the user.

8. The apparatus of claim 7, wherein extracting the header portion of the closed caption data is performed by sensing a predetermined pattern value corresponding to the header portion and sensing a starting part of the header portion.

9. An apparatus for detecting a format of closed caption data contained in a broadcast signal automatically and displaying the closed caption data, the apparatus comprising:
- a receiving unit, which receives information including the closed caption data extracted from the broadcast signal;
- a header extraction unit, which extracts a header portion of the closed caption data from the information including the closed caption data received by the receiving unit;
- a caption format detection unit, which detects information on the format of the closed caption data from the header portion extracted from the header extraction unit;
- a caption formation determination unit, which determines the format of the received closed caption data from the information detected by the caption format detection unit; and
- a caption decoder, which decodes the closed caption data according to the format of the closed caption data determined by the caption format determination unit and displays the closed caption data to a user,
- wherein the format of the closed caption data includes one of a format defined by an EIA-608 closed caption standard and a format defined by an EIA-708 closed caption standard, and wherein when the closed caption data contained in the broadcast signal received while the caption decoder decodes the closed caption data received according to the format of the EIA-708 closed caption standard according to the format determined by the caption format determination unit and displays the closed caption data to the user, is determined by the caption format determination unit as closed caption data having the format defined by the EIA-608 closed caption standard, the caption decoder decodes the closed caption data according to the EIA-608 closed caption standard automatically and displays the closed caption data to the user.

10. The apparatus of claim 9, wherein extracting the header portion of the closed caption data is performed by sensing a predetermined pattern value corresponding to the header portion and sensing a starting part of the header portion.

11. A method for detecting a format of closed caption data contained in a broadcast signal automatically and displaying the closed caption data, the method comprising:
- (a) receiving information including the closed caption data extracted from the broadcast signal;
- (b) detecting information on the format of the closed caption data from the received information including the closed caption data and determining the format of the closed caption data; and
- (c) decoding the closed caption data according to the determined format of the closed caption data and displaying the closed caption data to a user,
- wherein the format of the closed caption data in (b) or (c) includes one of a format defined by an EIA-608 closed caption standard or a format defined by an EIA-708 closed caption standard, and wherein when the format of the closed caption data detected in (b) is determined as the format defined by the EIA-708 closed caption standard and closed caption data having the format defined by the EIA-608 closed caption standard is received while the closed caption data received in (a) according to the EIA-708 closed caption standard in (c) is displayed to the user, the closed caption data is automatically decoded according to the EIA-608 closed caption standard and displayed to the user.

12. The method of claim 11, wherein (b) comprises:
- (b1) extracting a header portion of the closed caption data from the received information including the closed caption data; and
- (b2) detecting the information on the format of the closed caption data from the extracted header portion and determining the format of the closed caption data.

13. The method of claim 12, wherein the format of the closed caption data in (b2) includes one of a format defined by an EIA-608 closed caption standard and a format defined by an EIA-708 closed caption standard.

14. The method of claim 13, wherein when the format of the closed caption data detected in (b) is determined as the format defined by the EIA-608 closed caption standard and closed caption data having the format defined by the EIA-708 closed caption standard is received while the closed caption data received in (a) according to the EIA-608 closed caption standard in (c) is displayed to the user, the closed caption data is automatically decoded according to the EIA-708 closed caption standard and displayed to the user.

15. The method of claim 13, wherein when the format of the closed caption data detected in (b) is determined as the format defined by the EIA-708 closed caption standard and closed caption data having the format defined by the EIA-608 closed caption standard is received while the closed caption data received in (a) according to the EIA-708 closed caption standard in (c) is displayed to the user, the closed caption data is automatically decoded according to the EIA-608 closed caption standard and displayed to the user.

16. The method of claim 12, wherein (b1) comprises sensing a predetermined pattern value corresponding to the header portion and sensing a starting part of the header portion.

* * * * *